United States Patent
Kebler et al.

(10) Patent No.: US 10,382,217 B1
(45) Date of Patent: Aug. 13, 2019

(54) SINGLE ACTUAL-FORWARDER ELECTION IN MULTICAST VPNS

(71) Applicant: Juniper Networks, Inc., Sunnyvale, CA (US)

(72) Inventors: Robert W. Kebler, Newburyport, MA (US); Vikram Nagarajan, Chennai (IN); Sunil Kumar, Bangalore (IN); Sanoj Kadavil Vivekanandan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 545 days.

(21) Appl. No.: 15/085,321

(22) Filed: Mar. 30, 2016

(51) Int. Cl.
*H04L 12/46* (2006.01)
*H04L 12/751* (2013.01)
*H04L 12/18* (2006.01)

(52) U.S. Cl.
CPC ........ *H04L 12/185* (2013.01); *H04L 12/4641* (2013.01); *H04L 45/02* (2013.01)

(58) Field of Classification Search
CPC .... H04L 12/185; H04L 12/4641; H04L 45/02
See application file for complete search history.

(56) References Cited

U.S. PATENT DOCUMENTS

| | | | | |
|---|---|---|---|---|
| 2011/0305239 | A1* | 12/2011 | Chandrashekharachar | ........ H04L 12/185 370/390 |
| 2015/0117178 | A1* | 4/2015 | Kotalwar | ........ H04L 45/28 370/219 |
| 2015/0146603 | A1* | 5/2015 | Wu | ........ H04L 12/189 370/312 |
| 2016/0065380 | A1* | 3/2016 | Wright | ........ H04L 12/185 370/390 |

OTHER PUBLICATIONS

Adams et al., "Protocol Independent Multicast-Dense Mode (PIM-DM): Protocol Specification (Revised)," RFC 3973, Network Working Group, Jan. 2005, 61 pp.
Fenner et al., "Protocol Independent Multicast-Sparse Mode (PIM-SM): Protocol Specification (Revised)," RFC 4601, Network Working Group, Aug. 2006, 112 pp.
Holbrook et al., "Source-Specific Multicast for IP," RFC 4607, Network Working Group, Aug. 2006, 19 pp.
Handley et al., "Bidirectional Protocol Independent Multicast (BIDIR-PIM)," RFC 5015, Network Working Group, Oct. 2007, 43 pp.
Rosen et al., "Multicast in MPLS/BGP IP VPNs," RFC 6513, Internet Engineering Task Force (IETF), Feb. 2012, 88 pp.
Aggarwal et al., "BGP Encodings and Procedures for Multicast in MPLS/BGP IP VPNs," RFC 6514, Internet Engineering Task Force (IETF), Feb. 2012, 59 pp.
Aggarwal et al., "BGP Encodings for Multicast in MPLS/BGP IP VPNs," Network Working Group Internet Draft, draft-ietf-l3vpn-2547bis-mcast-bgp-00.txt, Jul. 2006, 45 pp.

(Continued)

*Primary Examiner* — Andrew Lai
*Assistant Examiner* — M Mostazir Rahman
(74) *Attorney, Agent, or Firm* — Shumaker & Sieffert, P.A.

(57) ABSTRACT

In some examples, a method includes receiving, by a first ingress network device of a network, a source tree join route message from an egress network device of the network, the source tree join route message specifying a multicast source and a multicast group, and in response to receiving, by the first ingress network device, a source active auto-discovery route message from a second ingress network device of the network indicating that the second ingress network device has switched from using a shared multicast tree to using a shortest path tree to deliver multicast traffic from the multicast source, electing one of the first ingress network device or the second ingress network device as a single active forwarder for forwarding the multicast traffic received from the multicast source for the multicast group.

16 Claims, 3 Drawing Sheets

(56) References Cited

OTHER PUBLICATIONS

"NG MVPN BGP Route Types and Encodings," Juniper Networks, Inc., Apr. 2009, 5 pp.
Singh, "NG MVPN-Control Plane Overview," Retrieved from https://packetpushers.net/ng-mvpn-control-plane-overview/, Dec. 3, 2014, 23 pp.

* cited by examiner

SINGLE ACTUAL-FORWARDER ELECTION IN MULTICAST VPNS

TECHNICAL FIELD

The disclosure relates to computer networks and, more particularly, to routing network traffic within computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize protocol independent multicast (PIM) as a multicast routing protocol to build distribution trees through the computer network for the transmission of multicast traffic between sources and receivers within customer sites for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

In addition, the computer network may be configured to support multicast VPNs (MVPNs) to enable Internet Protocol (IP) multicast traffic to travel between sources and receivers within customer sites. For one or more MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source.

SUMMARY

In general, this disclosure describes techniques for selecting a single active forwarder in MVPNs. The disclosed techniques may be used in a scenario where an MVPN network is configured to use inclusive provider tunnels for forwarding multicast traffic within the MVPN network from ingress network devices to egress network devices. Inclusive provider tunnels between ingress and egress network devices operate such that any multicast packet sent towards a core network will be received by all the provider edge (PE) routers connected to a multi-protocol label switching (MPLS) core network for that MVPN irrespective of whether the PE routers have interested listeners (receivers).

The techniques of this disclosure provide the ability for ingress network devices to the MVPN network to use border gateway protocol (BGP) MVPN control plane messages to select a single active forwarder for forwarding multicast traffic received from a multicast source. Ingress network devices may also use the BGP MVPN control plane messages to ensure that the selected single active forwarder is actually forwarding the multicast traffic before making the selection. The ingress network devices receive multicast traffic from outside the MPLS core network (initiated by a multicast source) and forward the multicast traffic into the MPLS core network toward multicast receivers. The egress network devices receive the multicast traffic from the network and forward the multicast traffic towards multicast receivers external to the network.

Selecting a single active forwarder for forwarding multicast traffic received from a multicast source from among the ingress network devices capable of forwarding the multicast traffic, as described in this disclosure, may provide certain advantages. For example, the techniques of this disclosure may reduce the amount of state stored by the network devices, providing a more scalable approach and improve the functioning of the network devices such as by preserving computing resources for other purposes. The techniques described herein may also leverage certain capabilities of BGP to allow for selecting one ingress network device over another for forwarding multicast traffic on a per-multicast flow basis.

In one example aspect, a method includes receiving, by a first ingress network device of a network, a source tree join route message from an egress network device of the network, the source tree join route message specifying a multicast source and a multicast group, and in response to receiving, by the first ingress network device, a source active auto-discovery route message from a second ingress network device of the network indicating that the second ingress network device has switched from using a shared multicast tree to using a shortest path tree to deliver multicast traffic from the multicast source, electing one of the first ingress network device or the second ingress network device as a single active forwarder for forwarding the multicast traffic received from the multicast source for the multicast group.

In another example aspect, a first ingress network device includes at least one computer processor, and a memory comprising instructions that when executed by the at least one computer processor cause the at least one computer processor to: receive a source tree join route message from an egress network device, the source tree join route message specifying a multicast source and a multicast group; and in response to receiving a source active auto-discovery route message from a second ingress network device of the network indicating that the second ingress network device has switched from using a shared multicast tree to using a shortest path tree to deliver multicast traffic from the multicast source, elect one of the first ingress network device or the second ingress network device as a single active forwarder for forwarding the multicast traffic received from the multicast source for the multicast group.

In a further example aspect, a non-transitory computer-readable storage medium encoded with instructions that, when executed, cause at least one processor of a first ingress network device to: receive a source tree join route message from an egress network device, the source tree join route message specifying a multicast source and a multicast group, and in response to receiving a source active auto-discovery route message from a second ingress network device of the network indicating that the second ingress network device has switched from using a shared multicast tree to using a shortest path tree to deliver multicast traffic from the multicast source, elect one of the first ingress network device or the second ingress network device as a single active forwarder for forwarding the multicast traffic received from the multicast source for the multicast group.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
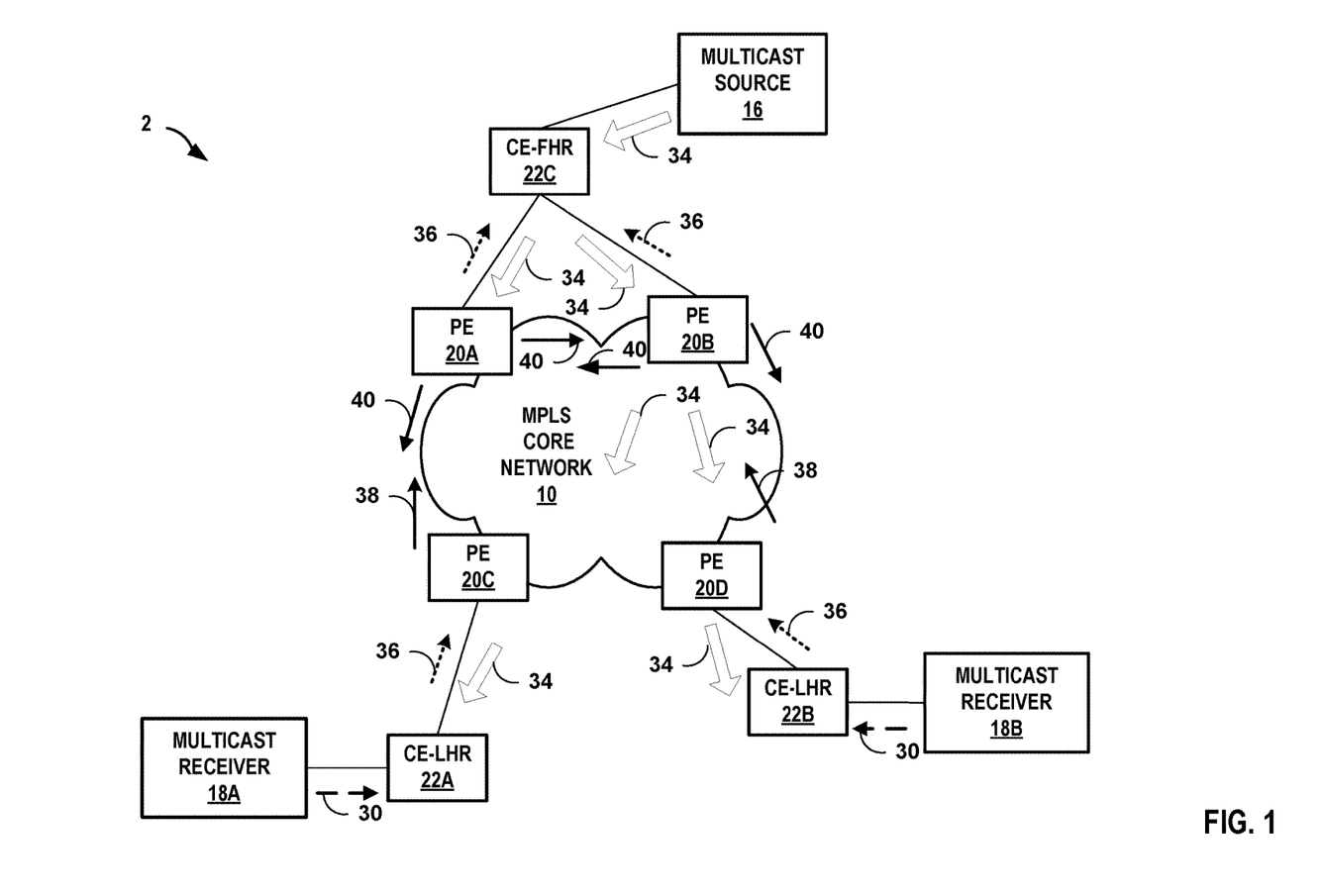
FIG. 1 is a block diagram illustrating an example computer network including network devices configured to transmit multicast traffic between one or more multicast sources and multicast receivers.

FIG. 1 is a block diagram illustrating an example computer network 2 including network devices configured to transmit multicast traffic between a multicast source 16 and multicast receivers 18A-18B ("multicast receivers 18"). In particular, FIG. 1 is a block diagram illustrating a network having network devices configured to elect a single active forwarder for forwarding multicast traffic received from a multicast source based on BGP MVPN control plane messages (routes) signaled and received by the ingress network devices to the MPLS core network 10. Ingress network devices may also use the BGP MVPN control plane messages to ensure that the elected single active forwarder is actually forwarding the multicast traffic, before making the selection, in accordance with the techniques of this disclosure.

Network 2 may comprise a private network or a public network, such as the Internet. For example, network 2 may be an enterprise network, a campus network, a service provider network, a home network, a local area network (LAN), a virtual local area network (VLAN), virtual private network (VPN), or another autonomous system. In any of these examples, remotely located multicast source 16 and multicast receivers 18 may share data via network 10. In an example of network 2 as an enterprise network, each of multicast source 16 and multicast receivers 18 may comprise one or more servers or employee computer terminals located in different regions of a single office location, or may comprise a remote office location of a corporation.

Network 2 includes a plurality of network devices, including a first network device, provider edge (PE) router 20A, and a second network device, PE router 20B, that are both connected to multicast source 16 via CE router 22C. Multicast source 16 is therefore referred to as being "multi-homed" to MPLS core network 10 because multicast traffic from multicast source 16 can reach MPLS core network 10 by multiple ingress PE routers (PE routers 20A and 20B). PE routers 20A-20D ("PE routers 20") operate on the edge of MPLS core network 10.

In some cases, CE routers 22A, 22B may be referred to as last hop routers (LHRs) connected to receivers 18. In some examples, receivers 18 are connected to MPLS core network 10 by a layer two (L2) broadcast communication domain such as a local area network (LAN) (e.g., an Ethernet LAN), and each of CE-LHRs 22A, 22B may be physically coupled to the L2 communication domain by a respective LAN interface. In some cases, CE router 22C may be referred to as a first hop router (FHR) connected to multicast source 16. A typical network topology includes multiple network devices within MPLS core network 10, but for purposes of illustration, these additional network devices are not shown in FIG. 1.

Each of source 16 and receiver 18 may be included in a remote customer site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

In the example illustrated in FIG. 1, multicast source 16 may provide multicast traffic for one or more multicast groups, and receivers 18 may request or subscribe to traffic from one or more multicast groups. Multicast source 16 may also be referred to herein as a "customer source (C-source)." Receivers 18 may comprise Internet Group Management Protocol (IGMP) hosts interested in receiving multicast traffic of a certain multicast group. In general, IGMP is a communications protocol used by hosts and adjacent routers to establish multicast group members. In the example of FIG. 1, IGMP operates between receivers 18 and CE-LHRs 22A-22B, and CE-LHRs 22A-22B may each be configured to use IGMP to communicate with receivers 18. For example, receivers 18A and 18B send IGMP join requests 30 for joining a multicast group to receive multicast traffic from multicast source 16.

In the illustrated example, network 2 includes a Multi-Protocol Label Switching (MPLS) core network 10, including network devices that use multicast routing protocols, such as Protocol Independent Multicast (PIM) and a Border Gateway Protocol (BGP), to route multicast traffic through network 10 between multicast source 16 and multicast receivers 18 for particular multicast groups. In some examples, network 10 may include one or more multicast virtual private networks (MVPNs) to enable multicast traffic to travel between sources and receivers, e.g., sources 16 and receivers 18, within remote customer sites. The MVPNs may be established between PE routers 20 of network 10. As shown, in response to receiving the IGMP join requests 30, CE-LHRs 22 send PIM join requests 36 to PE 20C and PE20D, respectively. PE routers 20C and PE 20D use BGP MVPN signaling to indicate that there are interested receivers for multicast source 16 (discussed in further detail below), and after being signaled by PE router(s) 20C, 20D, PE routers 20A and 20B may send PIM join requests 36 to CE-FHR 22C indicating they have interested receiver(s) for multicast source 16.

The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. The PIM join requests 36 can be from either of PIM modes ASM or SSM. Additional information regarding PIM protocols may be found in Adams, A., et al., "Protocol Independent Multicast Version 2—Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

MPLS core network 10 is a network including unicast upstream multicast hop (UMH). Inclusive Provider Tunnels (also referred to herein as "inclusive tunnels") may be configured on the PE routers 20 such that any multicast packet that is sent towards the core will be received by all the PE routers 20 connected to MPLS core network 20 for that MVPN irrespective of whether the PE routers 20 have interested listeners (receivers). That is, when using inclusive provider tunnels an ingress PE device injects multicast traffic in the MVPN by forwarding the traffic on all tunnels regardless of whether a receiver has expressly issued a join for the multicast source and group. For example, any multicast traffic received by ingress PE device 20A from multicast source 16 would be forwarded on respective inclusive tunnels to both PE 20C and 20D. Similarly, any multicast traffic received by ingress PE device 20B from multicast source 16 would be forwarded on respective inclusive tunnels to both PE 20C and 20D. This is contrast to Selective Provider Tunnels (also referred to herein as "selective tunnels"), in which traffic sent by a particular PE router is delivered to a subset of PE routers in a given MVPN instance that have signaled interested receivers, rather than to all PE routers in the MVPN instance. In general, network 10 may include MVPN inclusive provider tunnels as single multicast distribution trees configured to carry all multicast traffic from a set of one or more MVPNs. In one example, the MVPN inclusive tunnels may be established through network 10 using the PIM protocol.

MVPN auto-discovery may be provided by a unicast routing protocol, such as border gateway protocol (BGP), used to discover and maintain MVPN memberships of PE routers within network 10. BGP MVPN (sometimes referred to as "Next Generation (NG) MVPN") introduces a BGP control plane in the provider network for handling multicast. As described in further detail below, PE routers 20 use BGP control plane messages ("routes") for coordinating delivery of the multicast traffic. BGP MVPN introduces the concept of Provider Multicast Service Interfaces (PMSI) to bring separation between the "service" and "transport" mechanisms. A PMSI is a conceptual "overlay" on the provider network (P-network) that refers to a "service." This "overlay" can take packets from one PE router belonging to a particular MVPN and deliver them to other or all the PE routers belonging to that same MVPN. BGP MVPN is responsible for three major functions: 1. Auto-discovery, 2. P-Tunnel Signaling, and 3. customer multicast (C-MCAST) Route Signaling. Auto-discovery is the process of finding all of the PEs participating in a given MVPN instance. P-Tunnel signaling provides a way for PE routers to tell other PE routers what method they are going to use for transporting C-Multicast traffic (i.e., for establishing the PMSI tunnels). Options for establishing PMSI tunnels (which include inclusive provider tunnels and selective provider tunnels) include point-to-multipoint (P2MP) RSVP-TE, P2MP mLDP, multi-point-to-multipoint (MP2MP) mLDP, multicast Generic Routing Encapsulation (mGRE) or Ingress replication. C-MCAST Route Signaling is a way of exchanging C-Multicast control plane state, such as C-Join, C-Prunes and C-Register messages between relevant PE routers.

Depending on the network configuration, BGP MVPN may use selective provider tunnels (selective provider multicast service interface (S-PMSI)), inclusive provider tunnels, (inclusive provider multicast service interface (I-PMSI)), or wildcard PMSIs. In selective provider tunnels (S-PMSI), traffic sent by a particular PE router is delivered to subset of PE routers in a given MVPN instance, rather than to all PE routers in the MVPN instance. Creating a selective provider tunnel enables an ingress PE router to move high-rate traffic off the inclusive tunnel and deliver the multicast traffic only to receivers that request it. This can improve bandwidth utilization, but may not be desired by some customers for various reasons. A wildcard S-PMSI has the source or the group (or both the source and the group) field set to the wildcard value of 0.0.0.0/0 ("*") and advertises binding of multiple customer multicast flows to a single provider tunnel in a single S-PMSI auto-discovery route. In accordance with the techniques of this disclosure, ingress PE routers 20A and 20B are configured to use the BGP control plane messages to select a single active forwarder for forwarding the multicast traffic 34 received from multicast source 16. Ingress PE routers 20A and 20B may also use the BGP control plane messages to ensure that the selected single active forwarder is actually forwarding the multicast traffic. Ingress PE routers 20A and 20B may independently elect the same single active forwarder by running the same algorithms/policies for making the election.

PE routers participating in BGP MVPNs that use the BGP control plane use seven types of BGP MVPN routes (messages), five of which are used for auto-discovery and two for C-multicast protocol information exchange between provider edge (PE) routers. For example, PE routers 20 advertise their MVPN membership to other PE routers 20 using BGP, and PE routers 20 exchange BGP routing protocol messages to advertise various types of routes for controlling multicast distribution within network 2.

As one example, in a BGP MVPN, an MVPN type 1 route is an intra-autonomous system (AS) inclusive provider multicast service interface (I-PMSI) auto discovery (AD) route that is originated by all PE routers participating in an MVPN. The MVPN type 1 route includes a route type indicator, an originating router route distinguisher (RD), and an originating router loopback address.

An MVPN type 2 route is an inter-AS I-PMSI AD Route that is originated by all ASBR PE routers. The MVPN type 2 route includes a route type indicator, an originating router RD, and an AS number of the originating ASBR.

An MVPN type 3 route is a selective provider multicast service interface (S-PMSI) AD Route that is originated by the sender PE router (the sender PE that initiates the S-PMSI). The MVPN type 3 route includes a route type indicator, an originating router RD, Customer multicast Source address (C-S) Mask (32 for IPv4; 128 for IPv6), C-S Using S-PMSI, Customer multicast Group address (C-G) Mask (32 for IPv4; 128 for IPv6), C-G Using S-PMSI, and originating Router Loopback Address.

An MVPN type 4 route is a leaf AD Route that is originated by receiver PE routers in response to receiving S-PMSI AD routes with the "leaf information required" flag set from the sender PE router. The MVPN type 4 route includes a route type indicator, an S-PMSI AD route, and an originating router loopback address.

An MVPN type 5 route is a source active AD Route that is originated by the PE router that discovers an active VPN multicast source. The MVPN type 5 route includes a route type indicator, an originating router RD, C-S Mask (32 for IPv4; 128 for IPv6), Customer multicast Source address, C-G Mask (32 for IPv4; 128 for IPv6), Customer multicast Group address. In BGP MVPN shared-tree data distribution mode (RPT-SPT) mode, the MVPN type 5 route indicates that a switchover has occurred from (1) using a shared multicast tree rooted at a rendezvous point (RP) to deliver multicast traffic to (2) using a shortest path tree (SPT) rooted at the discovered multicast source to deliver the multicast traffic.

An MVPN type 6 route is a shared tree join route that is originated by the receiver PE router (the PE that receives a (C-*, C-G) join message from a VPN interface). The MVPN type 6 route includes a route type indicator, RD of Upstream PE (towards Customer Rendezvous Point (C-RP)), AS Number of Upstream PE (towards C-RP), C-RP Mask (32 for IPv4; 128 for IPv6), Customer Rendezvous Point Address, C-G Mask (32 for IPv4; 128 for IPv6), and Customer multicast Group address.

An MVPN type 7 route is a source tree join route that is originated by the receiver PE router (the PE that receives a local (C-S, C-G) join message or the PE that already has a Type 6 route and receives a Type 5 route). The MVPN type 7 route includes a route type indicator, RD of Upstream PE (towards C-S), AS Number of Upstream PE (towards C-S), C-S Mask (32 for IPv4; 128 for IPv6), Customer multicast Source Address, C-G Mask (32 for IPv4; 128 for IPv6), and Customer multicast Group address.

Additional information regarding MVPN may be found in Rosen, E., et al., "Multicast in MPLS/BGP IP VPNs," RFC 6513, February 2012, and Rosen, E., et al., "BGP Encodings and Procedures for Multicast in MPLS/BGP IP VPNs," RFC 6514, February 2012, the entire contents of each of which are incorporated by reference herein.

In the topology shown in FIG. 1, PE router 20C and PE router 20D are egress PE routers to the MPLS core network 10, in that they receive multicast traffic from MPLS core network 20 and forward the multicast traffic towards receivers external to MPLS core network 20. PE router 20A and PE router 20B are ingress PE routers to the MPLS core network 10, in that they receive multicast traffic from outside MPLS core network 20 (initiated by a multicast source 16) and forward it into MPLS core network 20 toward receivers 18. Multicast source 16 (a Customer-Multicast Source) is multi-homed to MPLS core network 10 via a first ingress network device (ingress PE router 20A) and a second ingress network device (ingress PE router 20B). Assume that BGP MVPN is configured to execute on PE router 20A, PE router 20B, PE router 20C, and PE router 20D, in BGP MVPN shared-tree data distribution mode (sometimes referred to as "rendezvous point tree shortest path tree (RPT-SPT) mode"). PE router 20C and PE router 20D are configured with unicast upstream multicast hop (UMH) such that PE router 20C and PE router 20D select the upstream PE routers solely based on their unicast algorithms. For example, when PE router 20C does a route lookup to the source, PE router 20C selects PE router 20A as its upstream PE by virtue of what its unicast routing table suggests. For example, PE router 20D may select PE router 20B as its upstream PE by virtue of its unicast table. PE router 20C will send a BGP Type-7 route towards PE router 20A, and PE router 20D will send a BGP Type-7 towards PE router 20B. Both PE router 20A and PE router 20B will send out PIM (S,G) join messages 36 towards multicast source 16.

When multicast source 16 begins sending multicast traffic 34, both PE router 20A and PE router 20B will pull traffic and forward the multicast traffic 34 towards MPLS core network 10. In the absence of the techniques of this disclosure, PE router 20C and PE router 20D would receive duplicate data packets from MPLS core network 10 because PE router 20C has no way to determine that PE router 20A and PE router 20B are forwarding traffic for the same multicast flow. PE router 20C would forward the duplicative data packets from both of the upstream PE routers to its downstream receiver 18A. Receiver 18A in turn receives the duplicate data packets, which is not desirable. In multicast, duplicates may be as much of a problem as traffic loss. The same duplicate issue may also happen with PE router 20D receiving traffic from multicast source 16.

One approach to the issue of duplicates is the "Default UMH approach," but this approach has certain limitations. R. Aggarwal, "BGP Encodings for Multicast in MPLS/BGP IP VPNs," Network Working Group, Internet Draft, July 2006, the entire contents of which are incorporated by reference herein, defines the default UMH selection mechanism in which, for a particular Customer source (C-Src), all the egress PE routers pick the same upstream Ingress PE router based on, e.g., lowest IP address. This may be undesirable for customers because if the selected ingress PE router, for some reason, is not able to pull traffic from source, all the egress PE routers will suffer. The egress PE routers might request to source traffic from an Ingress PE router that is nearer to it. By selecting a single PE router by virtue of, say, lowest IP, many egress PE routers might end up sourcing traffic from an Ingress router that is not the nearest one. If unicast UMH is deployed and other measures such as Sender Based reverse-path forwarding (RPF) and selective tunnels are not an option or not preferred, customers need another option to manage duplicates.

The disclosed techniques may be used in a scenario where an MVPN network is configured to use inclusive provider tunnels for forwarding multicast traffic within the MVPN network from ingress network devices to egress network devices. Inclusive provider tunnels between ingress and egress network devices operate such that any multicast packet sent towards a core network 10 will be received by all the provider edge (PE) routers connected to core network for that MVPN irrespective of whether the PE routers have interested listeners (receivers).

To further illustrate the problems addressed by the techniques described herein, this section provides an overview of BGP Type-5 routes and describes how Type-5 Source-Active Route works in BGP MVPN shared-tree data distribution mode, in the absence of the techniques of this disclosure. In BGP MVPN shared-tree data distribution mode, when an ingress PE router such as ingress PE router 20A receives a BGP Type-7 route 38 from an egress router such as egress PE router 20C, the ingress PE router sends out a BGP Type-5 route 40. This BGP Type-5 route, also called Source-Active Route, indicates that the ingress router has switched from forwarding multicast traffic from the multicast source on the shared tree to forwarding multicast traffic on the SPT (PIM Shortest Path Tree). When a PE router (e.g., PE router 20B) hosting a customer rendezvous point (C-RP) in its site receives this Type-5 route 40 from PE router 20A, the PE router 20B stops forwarding the multicast traffic for the source over the shared tree. This BGP Type-5 route is received by all the other PE routers and installed in their routing information table. Typically, this Type-5 route is processed only by the PE router which hosts the C-RP in its site, and the other PE routers do not process this Type-5 route. That is, this type-5 route will be received by other PEs (that are not connected to the C-RP), but, no meaningful action is prescribed with this route. This Type-5 route just remains in the BGP-MVPN route table but, no MVPN action is performed.

When an ingress PE router (such as PE routers 20A, 20B) coupled to a multicast source 16 receives routing protocol message advertising a BGP Type-7 route 38 from an egress router (such as PEs 20C, 20D), the ingress PE router generates and sends a routing protocol advertisement advertising a BGP Type-5 route 40. In accordance with the techniques of this disclosure, the BGP MVPN mechanisms configured on PE routers 20A and 20B are extended such that PE routers 20A and 20B send out BGP Type-5 only after detecting the onset of traffic on the interface facing multicast source 16 (and CE-FHR 22C). Deferring, by the ingress network device, sending a BGP Type-5 route (source active auto-discovery route message) indicating that the ingress network device discovered the multicast source responsive to the source tree join route message until determining that the ingress network device is receiving multicast traffic from the multicast source for the multicast group will ensure that only the ingress PE routers that are actively forwarding traffic are eligible to participate in the single forwarder election performed by the ingress PE routers.

In the example of FIG. 1, PE router 20C sends a Type-7 route 38 to PE router 20A and PE router 20D sends a Type-7 route 38 to PE router 20B. Based on the received type-7 routes 38, both PE routers 20A and 20B send out BGP Type-5 routes 40 to other PE routers 20. Both the forwarding ingress PE routers will receive the Type-5 routes 40 from the other Ingress PE router. In accordance with the techniques of this disclosure, based on the received Type-5 routes 40 PE routers 20A and 20B will elect a single active forwarder from all the eligible forwarders. PE routers 20A and 20B may be configured with a policy specifying criteria for this election. The criteria to be elected the single active forwarder can be as simple as the lowest/highest IP address, or it can be based on a BGP community configured to be used for Type-5 routes, for example. Other criteria may be used for electing the single active forwarder.

Once the PE routers 20A and 20B have elected the single active forwarder, the non-forwarder(s) will stop forwarding the multicast traffic 34 to the MPLS core network 10. For example, in FIG. 1, PE router 20B is elected the single active forwarder, and PE router 20B forwards the received multicast traffic 34 from the multicast source 16 for the multicast group. PE router 20A is not elected the single active forwarder, and so PE router 20A drops the received multicast traffic from the multicast source 16 for the multicast group. Thus, duplicate multicast traffic is avoided at the ingress side of MPLS core network 10, reducing an amount of duplicate traffic flowing across MPLS core network 10. The non-forwarder ingress PE routers will still keep their PIM (S,G) Joins towards multicast source 16 alive and pull traffic from the multicast source 16 via CE-FHR 22C, but the non-forwarder ingress PE routers will not forward the multicast traffic to MPLS core network 10. The rationale for this is that when a given non-forwarder PE router 20A later gets elected forwarder again, all PE router 20A has to do is to switch to forwarding the multicast traffic that is flowing already.

The egress PE routers will continue sending their Type-7 routes 38 based on the unicast-UMH. i.e., PE router 20C will continue to send its Type-7 route 38 to the non-forwarder PE router, PE router 20A. But, PE router 20C will forward traffic sent on the core by PE router 20B. This way, later when PE router 20D withdraws its Type-7 route to PE router 20B, PE router 20B will withdraw its Type-5 route and then PE router 20A can immediately start forwarding the multicast traffic. No changes will be needed in the control plane on PE router 20C. The new functionality has to be added only on the ingress PE routers to process the Type-5 routes and elect the forwarder in response to processing the type-5 routes, and the egress PE routers can benefit from this without any upgrade, assuming the egress PE routers do not have Sender Based RPF (SB-RPF) functionality configured. If the egress PE routers are enabled with SB-RPF, the egress PE routers may need to track the elected actual forwarder ingress PE router. No other control plane changes are necessary.

In one example, ingress PE routers 20A and 20B can be configured with one or more policies that instruct the ingress PE routers 20A and 20B to add BGP community values to BGP routes being advertised, such as type-5 routes 40. The policies can specify particular BGP community values to add to routes associated with particular multicast flows, i.e., on a per-multicast flow basis (per (C-S, C-G)). That is, PE routers 20A and 20B can inject a BGP community into the advertised routes (e.g., the type-5 routes). The policies configured on PE routers 20A and 20B that control the election of the single active forwarder may be based on the BGP communities of the type-5 routes advertised. The BGP community can then be used to set a route preference, and based on that route preference the ingress PE routers may select one of the ingress PE routers as the single active forwarder. This leverages the fact that BGP MVPN uses BGP, which has the feature of BGP communities available. In this way, for an individual multicast flow for a particular multicast source and multicast group, the PE routers 20A and 20B can elect one sender over another based on whether the stream is coming better from one ingress PE or another.

Figure 2:
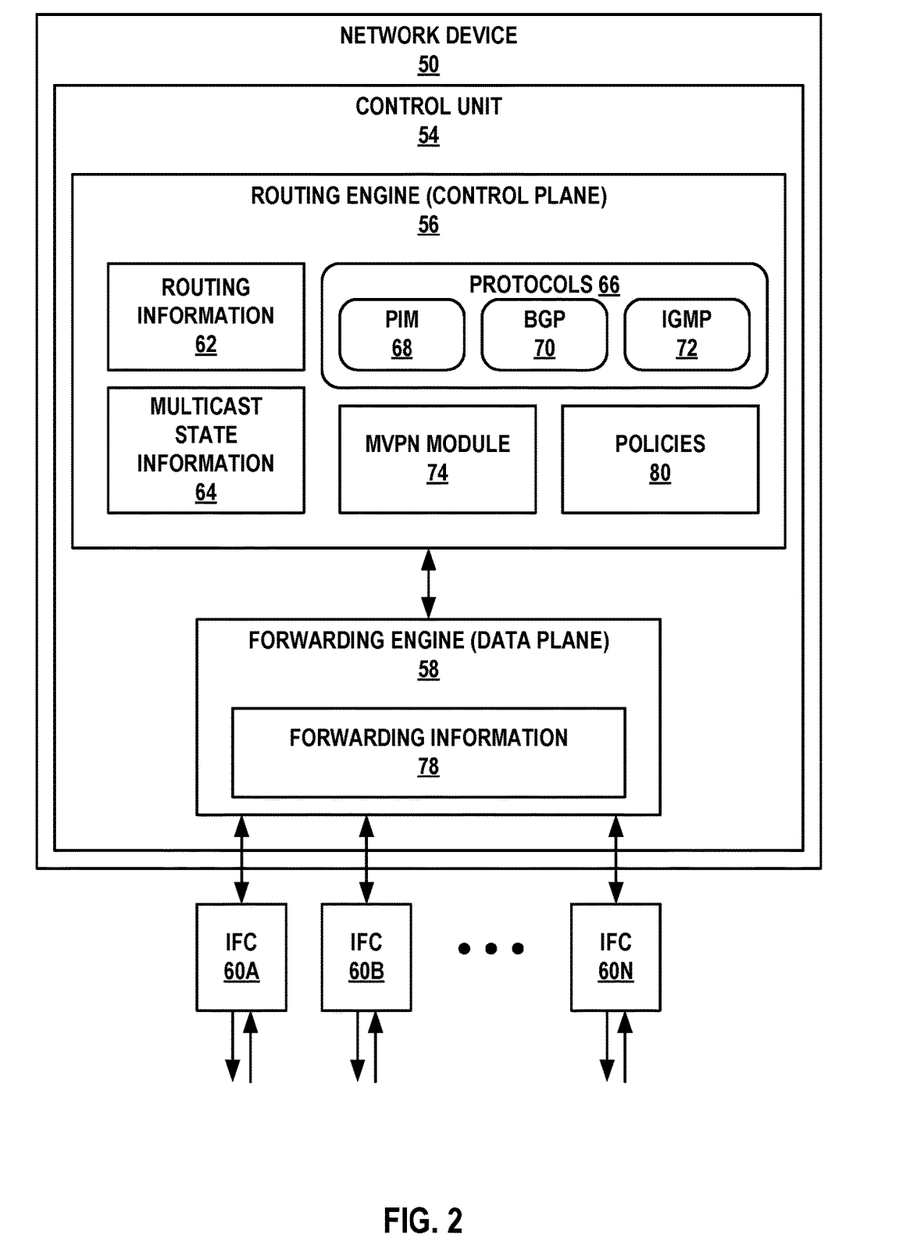
FIG. 2 is a block diagram illustrating an example network device configured to operate in accordance with techniques of this disclosure.

FIG. 2 is a block diagram illustrating an example network device 50 configured to operate in accordance with techniques of this disclosure. In one example, network device 50 may operate as an ingress network device to a core network, such as an MPLS core network. According to the disclosed techniques, as the ingress network device for the core network, network device 50 is configured to select a single active forwarder for forwarding multicast traffic based on source active auto-discovery route message(s) received from ingress network devices in a network. For example, network device 50 may operate substantially similar to ingress PE routers 20A and 20B from FIGS. 1 and 2.

In the illustrated example of FIG. 2, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing engine 56 and a forwarding engine 58. Routing engine 56 operates as the control plane for router 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 2, routing engine 56 includes a border gateway protocol (BGP) module 70 as a unicast routing protocol used to exchange routing information with other network devices in a network in order to discover the network topology and update routing information 62, and sending routes for MVPN auto-discovery, provider tunnel signaling, and customer multicast route signaling. In addition, routing engine 56 includes PIM module 68 as a multicast routing protocol used to build multicast distribution trees with the other network devices in the network using routing information 62 and multicast state information 64.

Routing engine 56 also includes IGMP 72 as a communications protocol used to establish multicast group memberships with IGMP hosts, e.g., receivers and sources, within customer sites external to the network. In some examples, routing engine 56 may receive IGMP report messages identifying a multicast group and, in some cases, a source of the multicast group in which an IGMP host is interested. Routing engine 56 may, in some examples, use PIM module 68 to generate the multicast control messages (e.g., PIM join messages and/or PIM prune messages) used to build the multicast distribution trees in the network.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group.

Multicast state information 64 may describe a current status of interfaces for the neighboring network devices in the multicast distribution trees established using PIM module 68. For example, multicast state information 64 may include multicast state (e.g., PIM join state and PIM prune state) for each different multicast group within a range of a given multicast distribution tree. More specifically, for each multicast group, multicast state information 64 may include upstream and downstream interfaces toward neighboring network devices that belong to the respective multicast group.

MVPN module 74 may be configured to establish and maintain MVPN distribution trees or tunnels within the network using one or both of PIM module 68 and BGP module 70. In cooperation with MVPN module 74, BGP module 70 sends and receives MVPN-related route messages, and may forward receive messages to MVPN module 74 for processing. In addition, MVPN module 74 may map MVPN membership information of other network devices within the network and generate multicast state for a given MVPN based on the MVPN membership information. In some examples, MVPN module 74 may store multicast state for one or more MVPNs in multicast state information 64. For example, MVPN module 74 may store to multicast state information 64 or routing information 62 information indicating that BGP type-5 routes have been received from ingress network devices for particular multicast (S,G), and may subsequently update multicast state information 64 or routing information 62 to remove entries when the type-5 routes have been withdrawn. The information stored based on received BGP type-5 routes may include IP addresses of the ingress network devices from which the messages were received, BGP communities contained within the BGP type-5 routes, or other information from the BGP type-5 routes.

Routing engine 56 analyzes routing information 62 and multicast state information 64 to generate forwarding information 78 installed in forwarding engine 58. Forwarding engine 58 provides data plane functionality for network device 50. Although not shown in FIG. 2, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, when network device 50 receives a source tree join route message from an egress network device of the network (e.g., a BGP MVPN type-7 route), the source tree join route message specifying a multicast source, the MVPN type-7 route is passed to MVPN module 74. In response to receiving the source tree join route message, MVPN module 74 may, in some examples, defer sending a source active auto-discovery route message (e.g., BGP MVPN type-5 route) indicating that the ingress network device discovered the multicast source responsive to the source tree join route message until MVPN module 74 has determined that network device 50 is receiving multicast traffic from the multicast source for the multicast group. That is, MVPN module 74 may check with routing engine 56 or forwarding engine 58 as to whether traffic is flowing on an interface towards the multicast source. Only after determining that network device 50 is receiving multicast traffic on the interface towards multicast source does the MVPN module 74 send the source active auto-discovery route message (BGP type-5 route) indicating that the ingress network device discovered the multicast source. This ensures that only network devices actually receiving the multicast traffic from the source will be counted among the eligible potential forwarders. MVPN module 74 may periodically or continuously check the status of the multicast flow being received from the multicast source. If the multicast flow is no longer being received, MVPN module 74 may withdraw the BGP type-5 route, and send a withdraw message to the BGP peer devices.

Network device 50 may also receive a source active auto-discovery route message from a second ingress network device of the network indicating that the second ingress network device has discovered the multicast source. In response to MVPN module 74 processing the received source active auto-discovery route message from the second ingress network device, in accordance with the techniques of this disclosure MVPN module 74 is configured to elect one of a plurality of eligible ingress network devices as a single active forwarder for forwarding multicast traffic received from the multicast source for the multicast group. The eligible ingress network devices may include, for example, network device 50 and the second ingress network device, as well as any other ingress network devices from which source active auto-discovery route messages have been received for the multicast source and group. MVPN module 74 may maintain information indicating the eligible potential forwarders in multicast state information 64, for example. After MVPN module 74 has elected a single active forwarder from among the eligible potential forwarders, MVPN module 74 may update multicast state information 64 to indicate the elected single active forwarder. MVPN module 74 may update the active forwarder election in response to detecting that a BGP type-5 route withdrawal has been received from the current active forwarder, as this removes the active forwarder from the group of eligible potential active forwarders.

When MVPN module 74 subsequently receives multicast traffic for a multicast source and group, MVPN module 74 checks to determine whether network device 50 is the elected single active forwarder for the multicast source and group. For example, MVPN module 74 performs a lookup in multicast state information 64 (or routing information 62) based on the multicast source and group to check whether there is information indicating that network device 50 is the elected active forwarder. If MVPN module 74 determines that network device 50 is the elected active forwarder, MVPN module 74 forwards the multicast traffic, and if not, MVPN module 74 drops the multicast traffic.

In some examples, MVPN module 74 is configured to elect one of the ingress network devices as the single active forwarder based on Internet Protocol (IP) addresses of the first ingress network device and the second ingress network device, e.g., a loopback address of the network devices specified in the type-5 routes. For example, MVPN module 74 may be configured to elect an ingress network device having a lowest IP address or a highest IP address. As another example, MVPN module 74 is configured to elect one of the ingress network devices as the single active forwarder based on BGP extended communities attributes of the type-5 route messages, and configured extended community preferences.

In one example, ingress PE routers can be configured with one or more policies that instruct the ingress PE routers to add BGP community values to BGP routes being advertised, such as type-5 routes. The policies can specify particular BGP community values to add to routes associated with particular multicast flows, i.e., on a per-multicast flow basis (per (C-S, C-G)). Network device 50 may receive configuration data specifying one or more BGP community values to add to source active auto-discovery route messages being sent by network device 50 for one or more multicast sources and multicast groups, on a per-multicast flow basis, and store the configuration data to policies 80. In turn, MVPN module 74 can inject a BGP community into the advertised routes (e.g., the type-5 routes) based on the configured policies 80.

Network device 50 may then also have policies configured in policies 80 that control the election of the single active forwarder, and in some examples these policies may be based on the BGP communities of the type-5 routes advertised. In this way, for an individual flow the PE routers can elect one sender over another based on whether the stream is coming better from one ingress PE or another, because if the multicast traffic is not yet flowing over the incoming interface (or if the flow has been disrupted), network device 50 will not trigger sending the BGP type-5 route having the BGP community (or may withdraw the BGP type-5 route), so network device 50 will not be among the eligible potential forwarders.

The BGP community can then be used to set a route preference in policies 80, and based on that route preference network device 50 may select one of the ingress PE routers as the single active forwarder. That is, MVPN module 74 of network device 50 may be configured to compare the BGP community values in each of the received source active auto-discovery route message indicating that the ingress network device discovered the multicast source (type-5 routes for the same (C-S, C-G)), and elect one of the ingress PE routers as the single active forwarder for the multicast source and multicast group based on this comparison of BGP community values. As one example, policies 80 may dictate that MVPN module 74 elect the ingress PE router having a lowest BGP community value. As another example, policies 80 may dictate that MVPN module 74 elect the ingress PE router having a highest BGP community value. This leverages the fact that BGP MVPN uses BGP, which has the feature of BGP communities available.

Figure 3:
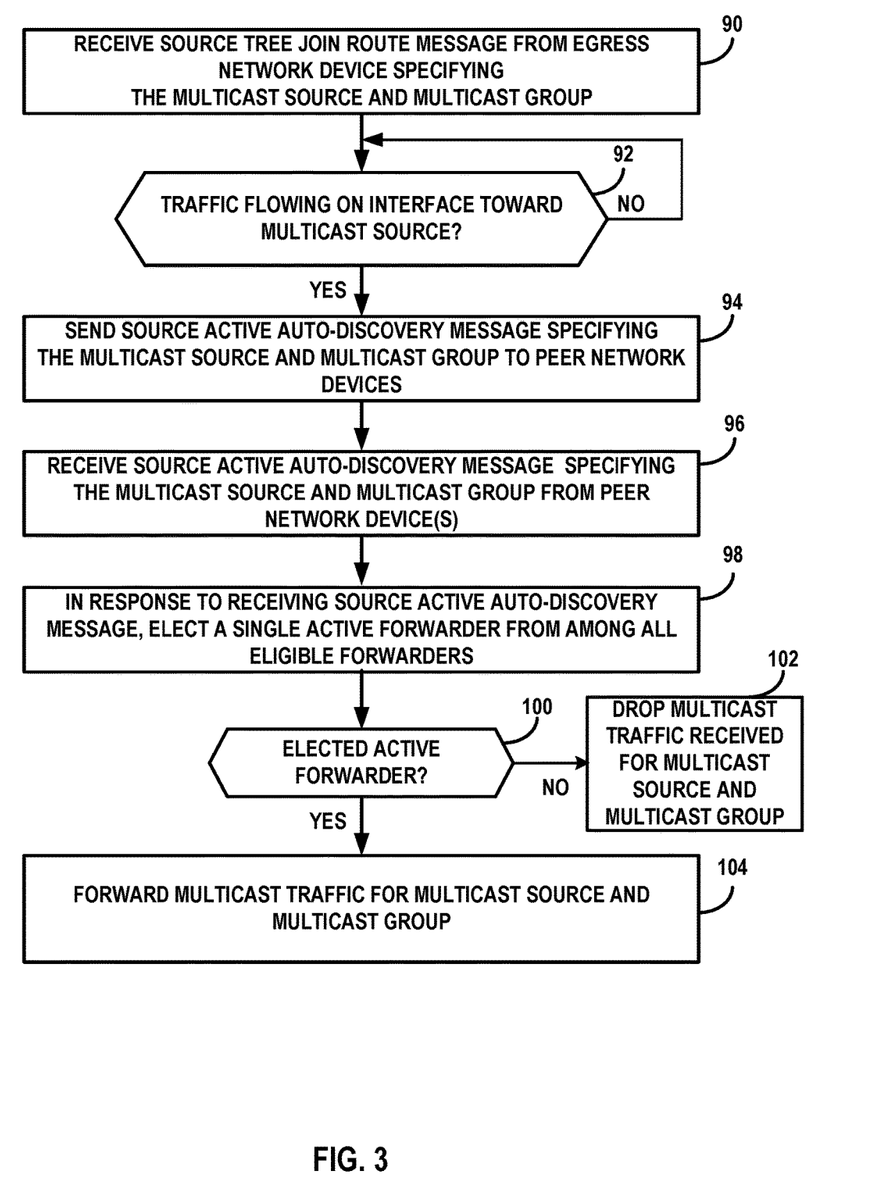
FIG. 3 is a flowchart illustrating an example operation of a network device selecting a single active forwarder for forwarding multicast traffic, in accordance with the techniques of this disclosure.

The architecture of network device 50 illustrated in FIG. 3 is shown for exemplary purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

FIG. 3 is a flowchart illustrating an example operation of a network device selecting a single active forwarder for forwarding multicast traffic, in accordance with the techniques of this disclosure. FIG. 3 is described for purposes of example with respect to network device 50 of FIG. 2, but is also applicable to FIG. 1 and may represent example operation of any of ingress network devices 20A and 20B. An ingress network device (e.g., network device 50) receives a source tree join route message from an egress network device specifying a multicast source and a multicast group (90). Instead of immediately sending a source active auto-discovery message in reply to peer network devices, network device 50 first determines whether traffic is flowing on the interface toward the multicast source (92). If traffic is not flowing, network device 50 defers sending the source active auto-discovery message (NO of 92). If traffic is flowing, network device 50 sends the source active auto-discovery message specifying the same multicast source and multicast group to its peer network devices (94).

Network device 50 receives one or more source active auto-discovery messages specifying the multicast source and the multicast group from peer network device(s) (96). Network device 50 may store state tracking the peer network devices from which a source active auto-discovery message has been received as a list of eligible potential forwarders for the multicast traffic (and including network device 50, as network device 50 has sent its source active auto-discovery message). Assuming the other peer network devices are similarly configured, they will only have sent the source active auto-discovery messages after determining that multicast traffic for the source is being received.

In response to network device 50 receiving the source active auto-discovery message, network device 50 elects a single active forwarder from among all the eligible forwarders (98), e.g., based on configured policies. If network device 50 is not the elected forwarder (NO of 100), network device 50 will drop multicast traffic received for the multicast source and group (102). If network device 50 is the elected forwarder (YES of 100), network device 50 will forward multicast traffic for the multicast source and group to the core network (104). Any other ingress network devices will perform a similar process, and elect the same active forwarder based on the same policies. In this manner, only one of the ingress routers forwards the multicast traffic to the core network, avoiding duplicate traffic in the core network while ensuring that the multicast traffic will be sent by at least one ingress router.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described in this disclosure. These and other examples are within the scope of the following claims.

What is claimed is:

1. A method comprising:
   receiving, by a first ingress network device of a network, a source tree join route message from an egress network device of the network, the source tree join route message specifying a multicast source and a multicast group;
   in response to receiving, by the first ingress network device, a first source active auto-discovery route message from a second ingress network device of the network indicating that the second ingress network device has switched from using a shared multicast tree to using a shortest path tree to deliver multicast traffic from the multicast source, electing one of the first ingress network device or the second ingress network device as a single active forwarder for forwarding the multicast traffic received from the multicast source for the multicast group;
   deferring, by the first ingress network device, sending a second source active auto-discovery route message indicating that the first ingress network device discovered the multicast source responsive to the source tree join route message until determining that the first ingress network device is receiving multicast traffic from the multicast source for the multicast group; and
   in response to determining that the first ingress network device is receiving multicast traffic from the multicast source for the multicast group, sending the second source active auto-discovery route message indicating that the first ingress network device discovered the multicast source.

2. The method of claim 1, further comprising:
   receiving, by the first ingress network device, multicast traffic from the multicast source for the multicast group;
   if the first ingress network device is elected the single active forwarder, forwarding, by the first ingress network device, the received multicast traffic from the multicast source for the multicast group; and
   if the first ingress network device is not elected the single active forwarder, dropping, by the first ingress network device, the received multicast traffic from the multicast source for the multicast group.

3. The method of claim 1, wherein the source tree join route message comprises a Border Gateway Protocol (BGP) multicast virtual private network (MVPN) type 7 route, and wherein each of the first source active auto-discovery route message and the second source active auto-discovery route message comprises a BGP MVPN type 5 route.

4. The method of claim 1, wherein the source tree join route message specifies a customer multicast source address for the multicast source and a customer multicast group address for the multicast group, and wherein each of the first source active auto-discovery route message and the second source active auto-discovery route message specifies the customer multicast source address for the multicast source and the customer multicast group address for the multicast group.

5. The method of claim 1, wherein electing one of the first ingress network device and the second ingress network device as the single active forwarder comprises electing based on Internet Protocol (IP) addresses of the first ingress network device and the second ingress network device.

6. The method of claim 1, wherein electing one of the first ingress network device and the second ingress network device as the single active forwarder comprises electing based on comparing a BGP community specified by the first source active auto-discovery route message received from the second ingress network device to a BGP community specified by the second source active auto-discovery route message sent by the first ingress network device.

7. The method of claim 1, further comprising receiving, by the first ingress network device, configuration data specifying one or more BGP community values to add to source active auto-discovery route messages being sent by the first ingress network device for one or more multicast sources and multicast groups, on a per-multicast flow basis.

8. The method of claim 1, wherein the first ingress network device comprises an ingress provider edge (PE) router that receives the multicast traffic from the multicast source from external to the network and forwards the multicast traffic into the network toward multicast receivers, and wherein the egress network device comprises an egress PE router that receives the multicast traffic from the network and forwards the multicast traffic towards multicast receivers external to the network.

9. A first ingress network device comprising:
at least one computer processor; and
a memory comprising instructions that when executed by the at least one computer processor cause the at least one computer processor to:
receive a source tree join route message from an egress network device of a network, the source tree join route message specifying a multicast source and a multicast group;
in response to receiving a first source active auto-discovery route message from a second ingress network device of the network indicating that the second ingress network device has switched from using a shared multicast tree to using a shortest path tree to deliver multicast traffic from the multicast source, elect one of the first ingress network device or the second ingress network device as a single active forwarder for forwarding the multicast traffic received from the multicast source for the multicast group;
defer sending a second source active auto-discovery route message indicating that the first ingress network device discovered the multicast source responsive to the source tree join route message until determining that the first ingress network device is receiving multicast traffic from the multicast source for the multicast group; and
in response to determining that the first ingress network device is receiving multicast traffic from the multicast source for the multicast group, send the second source active auto-discovery route message indicating that the first ingress network device discovered the multicast source.

10. The first ingress network device of claim 9, the memory further comprising instructions that when executed, cause the at least one processor of the computing device to:
receive multicast traffic from the multicast source for the multicast group;
if the first ingress network device is elected the single active forwarder, forward the received multicast traffic from the multicast source for the multicast group; and
if the first ingress network device is not elected the single active forwarder, drop the received multicast traffic from the multicast source for the multicast group.

11. The first ingress network device of claim 9, wherein the source tree join route message comprises a Border Gateway Protocol (BGP) multicast virtual private network (MVPN) type 7 route, and wherein each of the first source active auto-discovery route message and the second source active auto-discovery route message comprises a BGP MVPN type 5 route.

12. The first ingress network device of claim 9, wherein the source tree join route message specifies a customer multicast source address for the multicast source and a customer multicast group address for the multicast group, and wherein each of the first source active auto-discovery route message and the second source active auto-discovery route message specifies the customer multicast source address for the multicast source and the customer multicast group address for the multicast group.

13. The first ingress network device of claim 9, wherein the instructions to elect one of the first ingress network device and the second ingress network device as the single active forwarder further comprise instructions that when executed, cause the at least one processor of the computing device to elect the single active forwarder based on Internet Protocol (IP) addresses of the first ingress network device and the second ingress network device.

14. The first ingress network device of claim 9, wherein the instructions to elect one of the first ingress network device and the second ingress network device as the single active forwarder further comprise instructions that when executed, cause the at least one processor of the computing device to elect the single active forwarder based on comparing a BGP community specified by the first source active auto-discovery route message received from the second ingress network device to a BGP community specified by the second source active auto-discovery route message sent by the first ingress network device.

15. The first ingress network device of claim 9, further comprising instructions that when executed, cause the at least one processor of the computing device to:
receive configuration data specifying one or more BGP community values to add to source active auto-discovery route messages being sent by the first ingress network device for one or more multicast sources and multicast groups, on a per-multicast flow basis.

16. A non-transitory computer-readable storage medium encoded with instructions that, when executed, cause at least one processor of a first ingress network device to:
receive a source tree join route message from an egress network device, the source tree join route message specifying a multicast source and a multicast group;
in response to receiving a first source active auto-discovery route message from a second ingress network device of the network indicating that the second ingress network device has switched from using a shared multicast tree to using a shortest path tree to deliver multicast traffic from the multicast source, elect one of the first ingress network device or the second ingress network device as a single active forwarder for forwarding the multicast traffic received from the multicast source for the multicast group;
defer sending a second source active auto-discovery route message indicating that the first ingress network device discovered the multicast source responsive to the source tree join route message until determining that the first ingress network device is receiving multicast traffic from the multicast source for the multicast group; and
in response to determining that the first ingress network device is receiving multicast traffic from the multicast source for the multicast group, send the second source active auto-discovery route message indicating that the first ingress network device discovered the multicast source.

* * * * *